March 17, 1936.   C. SAURER   2,034,639
RESILIENT MOTOR MOUNTING
Filed Oct. 4, 1932   2 Sheets-Sheet 1

INVENTOR
Curt Saurer
ATTORNEYS

March 17, 1936.                 C. SAURER                 2,034,639
                        RESILIENT MOTOR MOUNTING
                    Filed Oct. 4, 1932        2 Sheets-Sheet 2
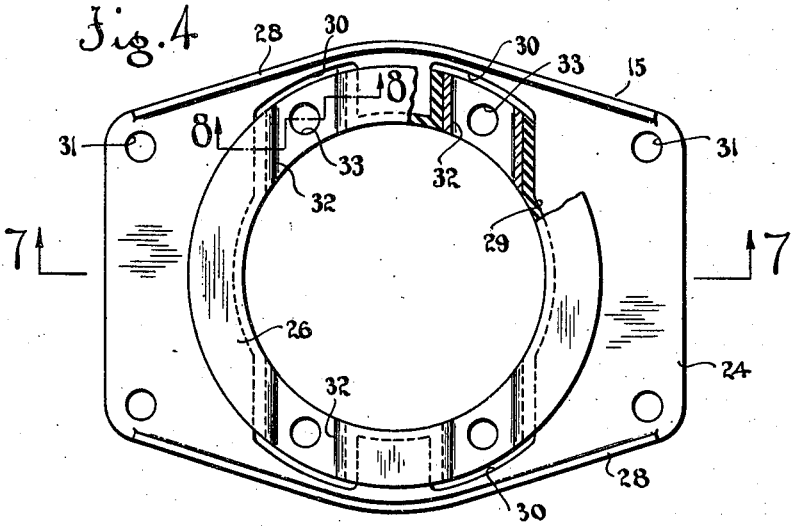
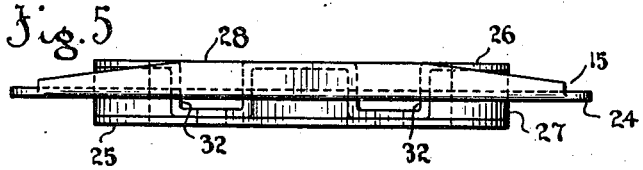
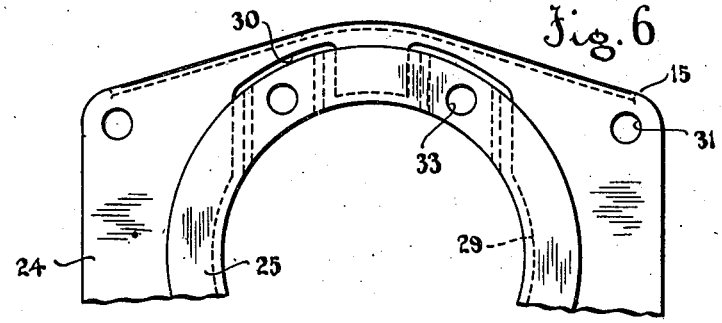
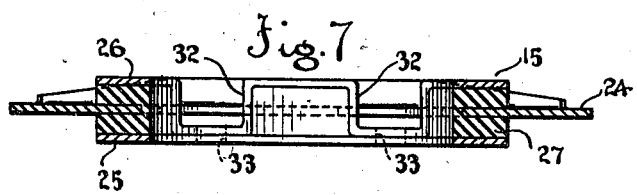
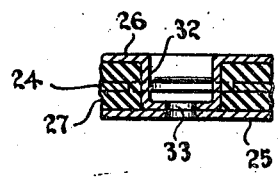
INVENTOR
Curt Saurer
ATTORNEYS Patented Mar. 17, 1936

2,034,639

UNITED STATES PATENT OFFICE 2,034,639

RESILIENT MOTOR MOUNTING

Curt Saurer, Akron, Ohio, assignor to The Firestone Tire & Rubber Company, Akron, Ohio, a corporation of Ohio Application October 4, 1932, Serial No. 636,146

5 Claims. (Cl. 248—7)

This invention relates to resilient motor mountings, and more especially it relates to resilient mountings for supporting the motors of automobiles and the like, in the automobile frame.

The chief objects of the invention are more efficiently and effectively to suppress all vibrations of a motor; and to provide a resilient motor support that will permit slight rotation of the rear of the engine with respect to its frame and will resist motor vibration mainly by the resistance to shear of its resilient component; and to provide a resilient motor mounting for the purpose of damping and resisting the vibration of the motor due to torque and thrust, and lateral and vertical vibration due to unevenness of the roadway, and to prevent said vibrations from being transmitted to the frame.

Of the accompanying drawings:

Figure 4 is a front elevation of the improved resilient motor mounting, a part being broken away and in section;

Figure 5 is a bottom edge view thereof;

Figure 6 is a fragmentary rear elevation thereof;

Figure 7 is a section on the line 7—7 of Figure 4; and

Figure 8 is a section on the line 8—8 of Figure 4.

Figure 1:
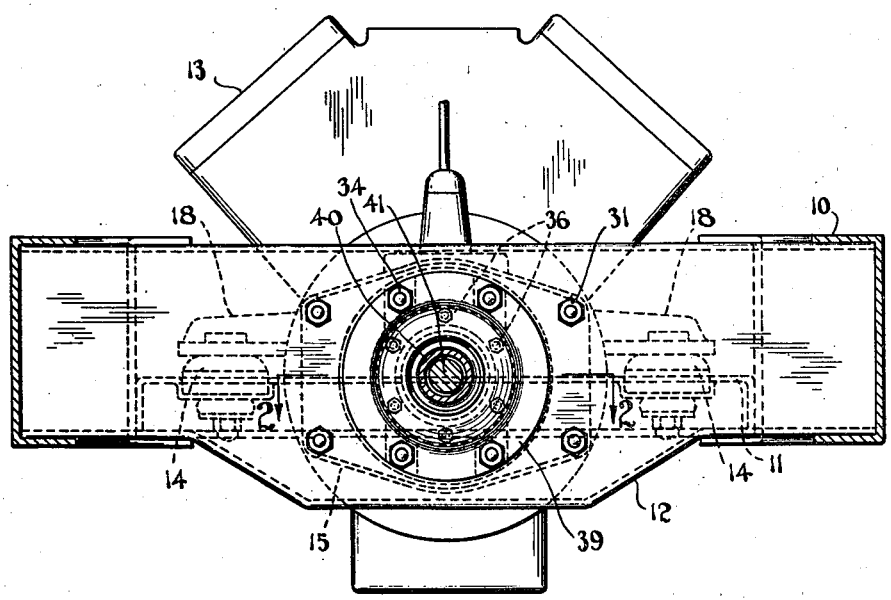
Figure 1 is an end elevation of an automobile motor, and a supporting structure therefor including the improved resilient motor mounting.
Figure 3:
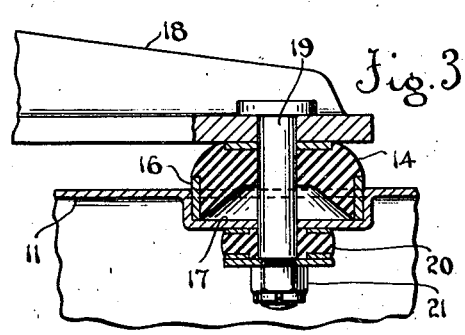
Figure 3 is a vertical section through one of the front motor supports.

Referring to the drawings, there is shown in Figure 1 thereof an automobile frame 10, a front motor support bracket 11, a rear motor support bracket 12, an internal combustion motor 13, a pair of resilient motor mountings 14, 14 between the motor and the bracket 11, and the improved resilient motor mounting, generally designated 15, between the motor and the rear motor support bracket 12. As is most clearly shown in Figure 3, each of the resilient motor mountings 14 comprises a concavo-convex resilient rubber structure having an inextensible peripheral band or collar 16, and is mounted in a recess 17 in the bracket 11, between the latter and an arm 18 constituting a part of the casing of the motor 13. A bolt 19 extending axially through the mounting 14 connects the arm 18 to the bracket 11, and a deformable washer 20 comprising rubber is positioned between the bracket 11 and a nut 21 on the bolt 19 to cushion the rebound of the motor 13 after the mounting 14 has been deformed by compression. The mounting 14 resists and damps vibration by its resistance to compression, which compression is set up in a radial direction in the resilient concavo-convex rubber structure.

The construction of the resilient motor mounting 15 is best shown in Figures 4 to 8 inclusive. It comprises a centrally apertured main plate 24, an annular plate or ring 25 on the rear side thereof, an annular plate or ring 26 on the front side thereof, and an annular body of resilient rubber 27 that bonds the front and rear plates to each other and to the main plate 24.

The main plate 24 is a generally rectangular structure having its long sides, which are the top and bottom of the plate, somewhat convex or outwardly bowed and formed with respective integral flanges 28 on the front side of the plate. The plate has a central, generally circular aperture 29, and extending outwardly from said aperture, at two points at top and bottom thereof, are recesses or notches 30, 30. The lateral edges of the latter are vertical and parallel to each other, and their outer edges are concentric with the margin of aperture 29. The plate 24 also is provided with bolt holes 31, 31 which receive bolts 32 that secure the mounting to the supporting bracket 12.

The front plate 26 is an annular metal structure, the inside diameter of which is somewhat smaller than the aperture 29 of main plate 24, and the outside diameter of which is considerably larger than aperture 29, but of smaller radius than the outer edges of recesses 30. At points corresponding to the said recesses 30 the plate 26 is formed with integral, laterally extending offset portions 32, 32, that have respective flat bottom walls lying in a plane parallel to the plane of the plate, and have lateral walls perpendicular to plate and said bottom walls. The offset portions 32 are of less overall width than the recesses 30, and in the assembled mounting they extend through said recesses and are equally spaced from the margins thereof on all sides.

The rear plate 25 is a flat, annular metal structure of the same outside and inside diameters as the plate 26. It is disposed on the opposite side of main plate 24 from the front plate 26, and lies flush against the offset portions 32 of the latter. Bolt holes 33, 33 extend through the abutting portions of plates 25, 26, in the offset portions 32 of the latter, for receiving bolts 34, 34 by means of which motor 13 is secured to the resilient mounting.

The front plate 26 and rear plate 25 are equally spaced from the main plate 24 at opposite sides thereof, and the resilient rubber structure 27 completely occupies the space between said plates and is adhesively attached, preferably by vulcanization, to all of them. The rubber structure 27 extends to the inner periphery of plates 25, 26 and thus substantially covers the margin of aperture 29 of the main plate, as is most clearly shown in Figures 4 and 7. The rubber also fills the spaces between the outer faces of offset portions 32 and the lateral edges of the recesses 30, as is most clearly shown in Figures 4 and 8.

Figure 2:
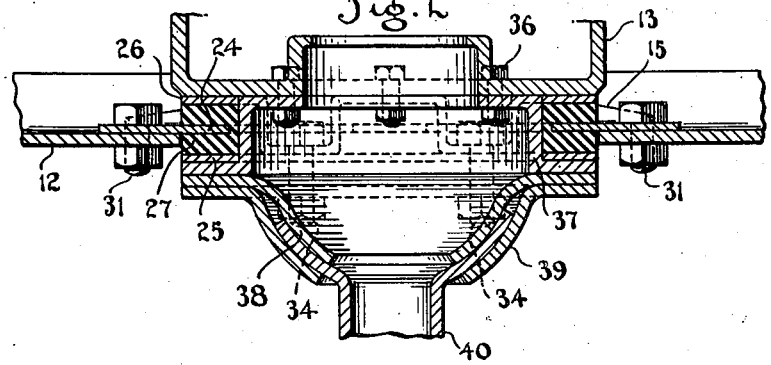
Figure 2 is a section of the rear motor support, on a larger scale, on the line 2—2 of Figure 1.

Figure 2 shows the manner of securing the motor 13 to the resilient mounting 15. Secured to the casing of motor 13 by bolts 36, 36 is an annular member 37 that is Z-shaped in section and fits snugly within the central aperture of the mounting 15, a part of the said member overlying the rear face of the resilient member 15. As hereinbefore stated, the member 15 is bolted to the bracket 12. Mounted upon the rear face of the member 37 are two members 38 and 39 of a ball and socket joint that includes a member 40 that is tubular in form and constitutes a shield or cover for the drive shaft of the motor 13, said drive shaft being shown at 41, Figure 1. The members 38, 39 are formed with axially apertured concavo-convex central portions that are spaced apart to receive a complementally shaped formation on the end of the member 40, whereby limited universal movement of the latter is permitted. The members 38, 39, and 37 are secured to member 15 by the bolts 34 hereinbefore mentioned.

It will be seen that the bracket 12 supports one end of the motor 13 through the agency of the resilient mounting 15. The arrangement is such that all torsional vibration and all lateral and vertical vibration is resisted and damped by the resistance of the rubber body 27 to shearing strains. Only axial thrust of the motor is subdued by the resistance to compression of said rubber body.

The motor mounting 15 in combination with the resilient motor mountings 14 at the opposite end of the motor effectively suppress practically all motor vibration so that none is transmitted to the frame of the automobile, whereby riding comfort is enhanced, and body squeaks are reduced to the minimum.

Modification may be resorted to without departing from the spirit of the invention or the scope of the appended claims, which are not limited wholly to the specific construction shown and described.

What is claimed is:

1. In a resilient mounting for motors, the combination of an annular plate adapted to be secured to a rear motor support, an annular plate adapted to be secured to the motor casing, and an annular body of resilient rubber bonding said plates to each other and serving as the sole supporting means at the rear end of the motor for transmitting the load of said motor to said support, said plates having no metal-to-metal connection and being disposed in planes at right angles to the shaft of the motor, said annular body of rubber permitting said motor casing to pivot thereabout as a fulcrum in absorbing motor oscillations.

2. In a resilient mounting for motors, the combination of a plate adapted to be secured to a motor support, a plate adapted to be secured to the motor casing, both of said plates encircling a portion of the motor and being disposed normal to the shaft of the motor, and a body of resilient rubber between said plates and bonded to both of them whereby lateral and torsional vibration of the motor is transmitted to the rubber body by movement of one of said plates, in its own plane, relative to the other plate, said body of resilient rubber being disposed in close proximity to said shaft to permit the motor to pivot universally about the rubber body as a fulcrum in the absorption of motor vibrations.

3. A vibration absorbing mounting comprising a main plate, a pair of lateral plates disposed one on each side thereof, and a body of rubber disposed between said main plate and said lateral plates, one of the lateral plates being formed with offset portions that abut the other lateral plate through recesses in the main plate.

4. In a resilient motor mounting the combination of a main plate formed with a central aperture, annular lateral plates on opposite sides of said main plates, said lateral plates being of smaller inside diameter than the aperture in said main plate, and positioned concentric with said aperture, and a body of resilient rubber bonding said lateral plates to each other and to the main plate and covering the marginal portion of the central aperture in the latter.

5. A combination as defined in claim 4 including offset portions on one lateral plate that abut the other lateral plate through recesses in the main plate.

CURT SAURER.